United States Patent [19]
Tafreshi

[11] Patent Number: 5,295,030
[45] Date of Patent: Mar. 15, 1994

[54] LOW PROFILE DISC CLAMP

[75] Inventor: Shahriar A. Tafreshi, Capitola, Calif.

[73] Assignee: Seagate Technology, Inc., Scotts Valley, Calif.

[21] Appl. No.: 893,490

[22] Filed: Jun. 5, 1992

[51] Int. Cl.⁵ .............................................. G11B 17/02
[52] U.S. Cl. ................................. 360/99.12; 360/99.05
[58] Field of Search .............. 360/99.12, 97.01, 98.08, 360/99.05

[56] References Cited

U.S. PATENT DOCUMENTS

| | | | |
|---|---|---|---|
| 4,205,357 | 5/1980 | Barton et al. | 360/98.08 X |
| 4,853,924 | 8/1989 | Takahashi et al. | 360/99.12 X |
| 4,945,432 | 7/1990 | Matsudaira et al. | 360/98.02 |
| 5,031,061 | 7/1991 | Hatch | 360/98.08 X |
| 5,136,450 | 8/1992 | Moir | 360/99.12 X |
| 5,150,267 | 9/1992 | Reinisch | 360/97.02 |

*Primary Examiner*—John H. Wolff
*Attorney, Agent, or Firm*—Edward P. Heller, III

[57] ABSTRACT

A circular disc drive disc clamp having a plurality of oval-shaped screw holes. The oval shape prevents the interference of the outer edge of the clamp's mounting screws. This permits the use of larger mounting screws to provide increased shock resistance. It also moves the screw contact inward to smooth the spring rate of the clamp around its periphery. It also reduces the overall stack height of the clamp and spring combination.

1 Claim, 3 Drawing Sheets

LOW PROFILE DISC CLAMP

Background of the Invention

1. Field of the Invention

The invention relates to the field of disc drives an more particularly to spindle motor disc clamps therefor.

2. Brief Summary of the Prior Art

A primary function of a spindle motor disc clamp is to clamp the stack of discs to a flange on the "bottom" of the disc drive's spindle motor. Unless the force applied is sufficient, the discs will move under shock and vibration, rendering the drive useless. Further, unless the force applied is uniform, the discs themselves will "waffle," creating unacceptable "runout" conditions.

One type of disc clamp known to small form factor drives is a substantially circular "leaf spring" clamp affixed to the top of the spindle with one screw for "rotating shaft" spindle motors, and with a plurality of screw for "fixed shaft" spindle motors. An example of the latter is illustrated in FIGS. 1 and 2 of U.S. Pat. No. 4,896,231, which patent is hereby incorporated by reference as if set forth fully herein.

There are two problems with the latter configuration as disc drives become both smaller and the need for shock resistance increases: First the screws have to be larger to provide increased torque on the "spring." And second, the distance from the outer most edge of the screw contact and the location of clamp-disc contact is shortened as disc inside diameters become smaller and the screws larger. This magnifies the variable spring-rate problem caused with plural screws. The variable spring rate problem induces a non uniform clamping force about the periphery of the clamp, which in turn induces the waffling problem.

Efforts to move screw contact to the radially innermost (from the disc clamp point of view) part of the screw flange via a washer centered on the center of the spindle suffers the drawback of adding to the overall stack height of the disc clamping mechanism, thereby either limiting drive height reduction or limiting motor height and, therefor, motor torque.

Summary of the Invention

The invention comprises forming the sundry disc clamp screw holes of a circular, leaf spring disc clamp into an oval shape such that the point of contact of the disc clamp screw flanges lies toward the center of the clamp.

DETAILED DESCRIPTION OF THE PREFERRED EMBODIMENT

Figure 1:
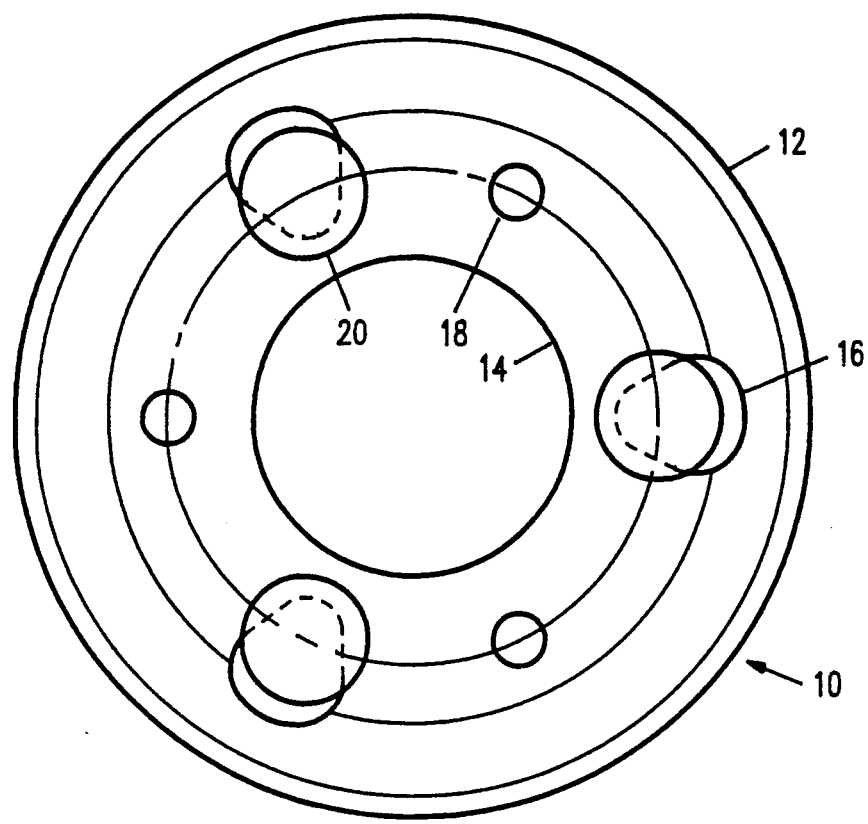
FIG. 1 is a top plan view of a disc clamp according to the present invention.

Referring to FIG. 1, disc clamp 10 is substantially circular having an OD 12 and an ID 14. The clamp has several bends, illustrated in FIG. 2, which generally creates a leaf spring effect. The spring is provided with a plurality of screw holes 16 and a plurality of torque holes 18. The latter are used by tools which need to grasp the spindle and either hold it in place or rotate it without aid of the spindle motor.

Figure 3:
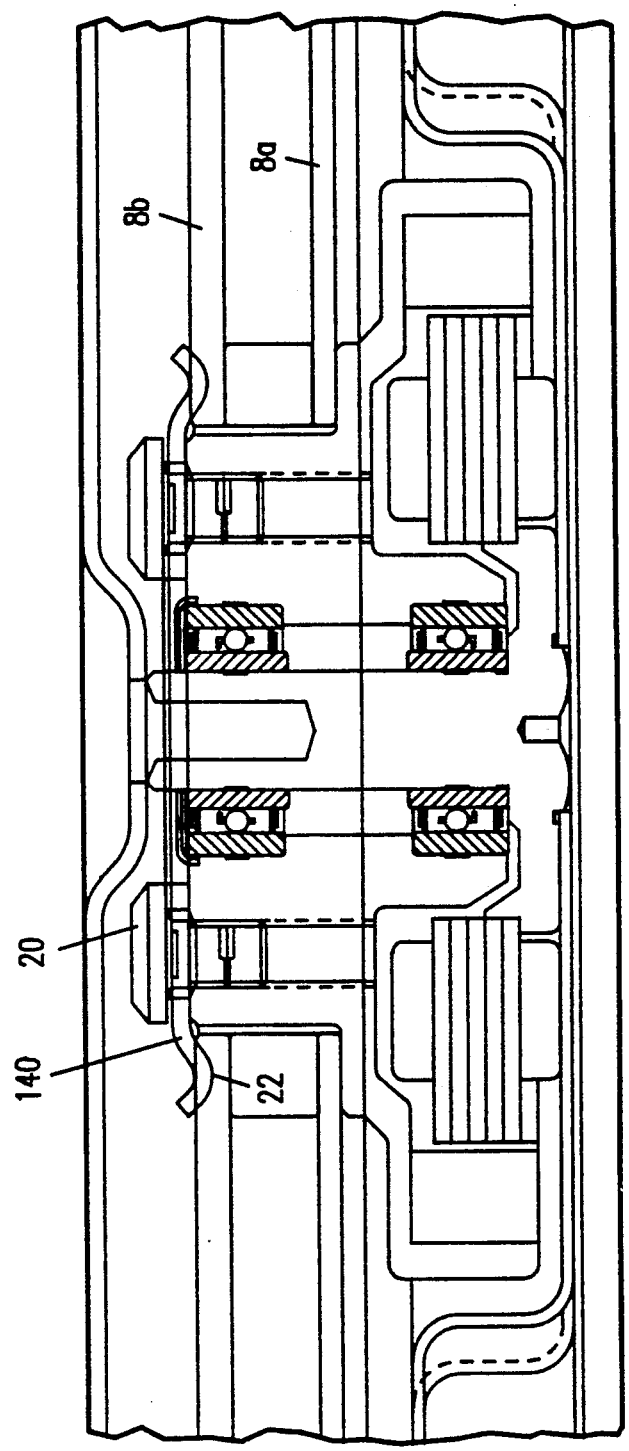
FIG. 3 is a partial cross sectional view of the a disc drive having a prior art disc clamp in an "unflexed" condition to illustrate the vertical space saved with the present invention.

Also shown in this figure are mounting screws 20. These mounting screws screw into corresponding holes in disc drive spindle 134 (FIG. 3). The screws' flange sections are circular in shape. However the disc clamp screw holes 16 are oval in shape, substantially symmetrical about a radius drawn through the center of a hole, with the wider portion of the oval radially outermost.

The screw size and spindle screw hole location are selected such that the outermost edge of the screw flange does not interfere with the disc clamp, but rather lies within the edge of the oval screw hole.

Figure 2:
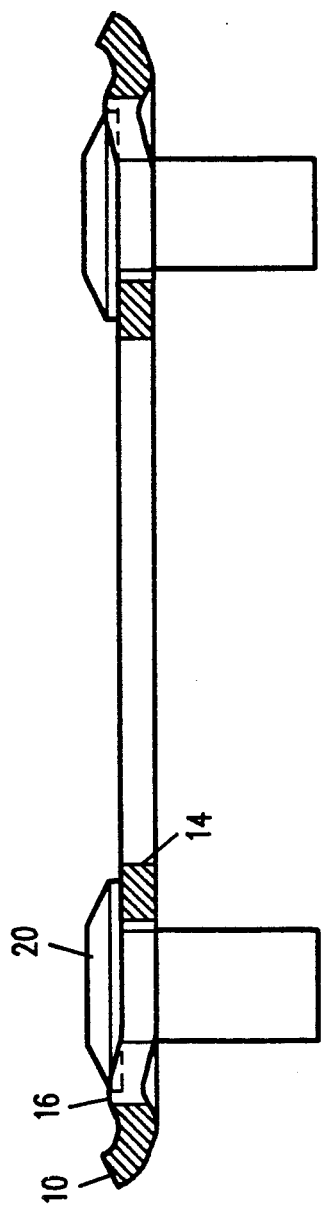
FIG. 2 is a side cross sectional view of the disc clamp of FIG. 1 in a "clamped" position.

The effect of this arrangement is best illustrated by comparing FIGS. 2 and 3. In FIG. 2, screw 20 is fully seated. The screw contacts the disc clamp at its radially innermost edge. Further, the spring section of the claim is allowed to flex above the level of the screw flange.

Compare this to FIG. 3, which shows an older arrangement. Here the disc clamp screws are shown spaced slightly above the clamp. The clamp itself is shown in its fully unflexed condition such that the lowermost lip of the clamp at 22 lies below the level of the top of the top of the topmost disc 8a. In an actual drive, the clamp would ride on the top of the disc and be pressed up against the bottom of the screw flange. Further, due to the bending of the clamp, the disc clamp will contact the screw flange at its radially (from the point of view of the disc clamp) outermost edge.

The effect of this new structure is to permit both the lowering of the overall stack height of the disc clamp structure, which includes the disc clamp mounting screws, and to move the point of contact radially inward. Moving the point of contact of the screw to the disc clamp radially inward evens the spring rate at the edge of the spring and thereby lessens the disc "waffling" problem.

The use of oval screw holes also permits the use of larger screws in a smaller drive. Larger screws permit less screw stress and/or increased screw torque which is essential in increasing shock resistance.

I claim:

1. In a disc drive spindle having a circular leaf spring disc clamp, a plurality of oval-shaped screw apertures each having a wider section, said apertures being substantially symmetrical about respective disc clamp radii drawn through the centers of respective apertures, the wider section of the oval lying radially outermost on said disc clamp; and a corresponding plurality of screws having circular contact flanges extending through said apertures and clamping said disc clamp to said spindle by said flanges abutting the disc clamp; the size of each screw flange and the location of each screw being so arranged on the spindle that each screw flange contacts the disc clamp only at its radially innermost edge, such that the outermost edge of the screw flange does not interfere with the disc clamp, but rather lies within the edge of the oval screw aperture.

* * * * *